United States Patent [19]

Kuan

[11] 4,383,074

[45] May 10, 1983

[54] BUSHINGS

[75] Inventor: Tiong H. Kuan, Stow, Ohio

[73] Assignee: The General Tire & Rubber Company, Akron, Ohio

[21] Appl. No.: 388,806

[22] Filed: Jun. 16, 1982

[51] Int. Cl.³ .................. C08K 3/04; F16C 27/06; F16F 1/38
[52] U.S. Cl. .................. 524/496; 308/184 R; 428/36
[58] Field of Search .......... 524/496; 308/26, 184 R; 428/36

[56] References Cited

U.S. PATENT DOCUMENTS 3,364,156 1/1968 Kraus ................ 524/496
3,666,335 5/1972 Mundy et al. ......... 308/26
3,864,305 2/1975 Jordan et al. ........ 524/496

Primary Examiner—Allan Lieberman

[57] ABSTRACT

A resilient bushing suitable for automobiles and other vehicles is disclosed wherein the rubber compound of said bushing contains carbon blacks of different particle sizes, surface areas and structures.

8 Claims, No Drawings

BUSHINGS

This invention relates to a rubber composition or compound useful for improving bushings or silentblocs for vehicles such as automobiles and trucks.

BACKGROUND OF THE INVENTION

In the automotive industry, including trucks, bushings are used in the suspension systems. More recently bushings are also being used to anchor stabilizer arms. Initially the bushings consisted of an annular metal-lined opening in which a pin rotated through an angle up to about 90°. The metal-to-metal contact permitted corrosion of the bushing and also wear due to metal-to-metal movement. The bushing also required lubrication. An additional disadvantage of the all-metal bushing was that vibrations were transmitted through the bushings. In order to reduce the vibration transmitted through the metal bushing, it was replaced by a three-piece bushing comprising a pair of spaced concentric metal members or sleeves separated by an annular sleeve or member of rubber. The stabilizer arm shaft or pin mounted in the suspension system rotated in the inner concentric metal member, and in many instances rotation in the inner concentric metal member (inner) perpetuated many of the problems inherent in bushings having relative movement between two metal members.

To eliminate the problem of relative movement between two metal members, a shaft or pin was fixed to the inner concentric metal member of the bushing (inner) resulting in relative movement between the inner and the outer spaced concentric member (outer). This relative movement generates a stress in the rubber annular member producing a strain in the rubber member. The constant of proportionality which relates stress and strain of a bushing is defined as the dynamic spring rate. From a load-deformation standpoint, a softer bushing (one with a low spring rate) is expected to fail faster on fatigue than a harder bushing of a similar composition, when tested at equal load condition.

In addition to meeting a specified spring rate, it is also desirable that the bushing have good vibration damping properties and a long fatigue life. Fatigue life refers to the ability to withstand a large number of rotary oscillations.

OBJECTS

An object of this invention is to provide a bushing exhibiting improved fatigue life.

These and other objects and advantages of the present invention will become more apparent to those skilled in the art from the following description and working examples.

SUMMARY OF THE INVENTION

According to the present invention a bushing having improved fatigue life is provided by using in the rubber compound or member of the bushing carbon blacks of different particle sizes, surface areas and structures. The fatigue life of the bushing is improved without significantly affecting spring rate or damping and without requiring an extra manufacturing step.

The trend is toward bushings having a lower dynamic spring rate for the front ends of smaller cars, e.g., a softer bushing, and a softer bushing is expected to fail faster. However, according to the present invention, while the spring rate may be slightly lower, the fatigue life is much greater. In other words the present invention permits the production of bushings having improved fatigue life with minimal change in dynamic spring rate.

DISCUSSION OF DETAILS AND PREFERRED EMBODIMENTS

In the rubber composition or compound of the bushing there is used (A) from about 10 to 30 phr (parts by weight per 100 parts by weight of rubber) of a reinforcing furnace carbon black having a particle size of from about 15 to 50 m$\mu$ (millimicrons), a surface area of from about 60 to 140 m$^2$/g (square meters per gram) and a DBPA (dibutyl phthalate absorption) of from about 80 to 135 cc/100 g (cubic centimeters per 100 grams) and (B) from about 5 to 30 phr of a reinforcing furnace carbon black having a particle size of from about 50 to 85 m$\mu$, a surface area of from about 20 to 50 m$^2$/g and a DBPA of from about 50 to 80 cc/100 g.

The other components of the rubber composition or compound comprise the usual compounding ingredients such as zinc oxide, stearic acid, accelerators, oil, antioxidants, sulfur and so forth. Other conventional rubber compounding ingredients can be present such as clays, silica, inhibitors, antidegradants and so forth. They may be blended or mixed together on a 2-roll rubber mill, in a Banbury and the like. The rubber compound is cured or vulcanized in the conventional manner. Likewise, known equipment can be utilized to mold the rubber compound to form the annular rubber insert in compressed relation between a rigid or substantially rigid cyclindrical inner metal member or sleeve and a rigid or substantially rigid outer metal member or sleeve. While steel is the preferred metal to use for the inner and outer members of the bushing, other metals, alloys or other useful materials may be used where appropriate.

For bushings, the rubber employed is natural rubber or synthetic rubbery polyisoprene or mixture thereof, natural being preferred. While the present invention is preferably directed to the preparation of rubber compounds for bushings, the rubber compound can be used in the manufacture of brake cups, brake diaphragms, engine mounts or any application requiring dynamic excitation.

The principles of this invention, e.g., the use of certain carbon blacks in a natural rubber compound for bushings and the like, can equally apply to the use of a combination of such blacks in other rubbers to improve their properties such as rubbery polybutadiene, butadiene-1,3/styrene copolymers, butadiene-1,3/acrylonitrile copolymers, polychloroprene, ethylene-propylene-non conjugated diene copolymers (EPDM's), polyurethanes, butyl rubber and so forth and mixtures thereof.

The following examples will serve to illustrate the present invention with more particularity to those skilled in the art. In the examples parts are parts by weight unless otherwise noted.

EXAMPLE 1

The following rubber compositions or compounds were compounded or mixed together:

| Material | Parts By Weight | | |
| --- | --- | --- | --- |
|  | Run 1 (control) | Run 2 (control) | Run 3 (invention) |
| SMR-5 (Natural Rubber) | 100 | 100 | 100 |
| PARA FLUX 2016 | 13 | 13 | 13 |

-continued

| Material | Parts By Weight | | |
|---|---|---|---|
| | Run 1 (control) | Run 2 (control) | Run 3 (invention) |
| Zinc oxide | 5 | 5 | 5 |
| Stearic acid | 1.5 | 1.5 | 1.5 |
| TMTM | 0.2 | — | — |
| NOBS Special | 0.9 | 1.0 | 1.0 |
| Sulfur | 2.25 | 2.75 | 2.75 |
| AMINOX | 1.0 | — | — |
| S-315 Carbon Black (Control) | 34 | 34 | — |
| ISAF-HS Carbon Black | — | — | 18 |
| SRF Carbon Black | — | — | 16 |
| | 157.85 | 157.25 | 157.25 |

Samples of the above compounded and uncured compositions were tested on the Monsanto ODR (Oscillating Disc Rheometer) at 160° C. and gave the following results:

TABLE 1

| | Run 1 | Run 2 | Run 3 |
|---|---|---|---|
| $M_L$, Mooney units[1] | 7.1 | 5.0 | 6.2 |
| $M_H$, Mooney units[2] | 32 | 28.6 | 28.0 |
| $t_2$, minutes[3] | 3.6 | 4.0 | 4.2 |
| $t_{90}$, minutes[4] | 5.7 | 6.7 | 9.0 |
| Mooney viscosity, large rotor, 1 + 4 at 100° C. | 52 | 51 | 57 |

[1] Lowest Mooney reading on graph
[2] Maximum Mooney reading on graph
[3] Time for torque value to rise 2 units above lowest Mooney reading on graph
[4] Time for torque value to reach 90% of maximum Mooney reading on graph Samples of the above compounded and uncured compositions were compression molded and cured at 315° F. for 5 to 8 minutes into non insert or simple specimens and tested for general physical properties and gave the following results:

TABLE 2

| | Run 1 | Run 2 | Run 3 |
|---|---|---|---|
| Shore A Durometer hardness | 61 | 60 | 57 |
| 10% Modulus, MPa | 0.27 | 0.25 | 0.24 |
| 100% Modulus, MPa | 1.7 | 1.9 | 1.8 |
| 300% Modulus, MPa | 5.9 | 5.8 | 5.7 |
| Tensile Strength, MPa | 24.2 | 27.6 | 25.7 |
| Elongation, % | 755 | 835 | 810 |

The cure characteristics and some simple properties of the compound of Run 3 are about the same as those of the two controls as shown in the above tables.

Samples of the above compounds were transfer molded into inserts to form a medium sized automobile bushing; cylindrical or tubular (annular) rubber member disposed under compression between inner and outer phosphate coated steel sleeves, e.g., a silentbloc, cured at 315° F. for 15 to 18 minutes and tested for bushing performance as follows:

TABLE 3

| | Run 1 | Run 2 | Run 3 |
|---|---|---|---|
| Dynamic Spring Rate # (K*), kN/m | 2256 | 2195 | 1985 |
| Damping Coefficient # (C), kN-sec/m | 1.72 | 1.40 | 1.12 |
| Fatigue Life** (N) kc to failure | 48 ± 16.2 | 58.7 ± 7.5 | 128 ± 45.0 |

MTS-Gilmore load frame: 136.2 kg preload; 20 Hz; ±0.015 cm radial deflection
**Clevite machine: 545.5 kg radial load; ±22° torsion; 4.2 Hz For K* and C determination, the bushings were mounted in the Gilmore load frame. Sinusoidal excitation of bushings was controlled by the MTS machine.

K* is obtained directly from the force-displacement diagram generated. C is calculated from the measured phase angle, δ, according to the equation:

$$C = (K^* \tan \delta)/(2\pi f)$$

where f is the frequency of excitation, in cps or Hz units.

For fatigue life measurement, the bushings were loaded in a Clevite fatigue testing machine. The required radial load was applied at the inner metal while torsional excitation was through the outer metal. Failure or fatigue life is the number of cycles or time spent in causing the loaded portion of the rubber insert to rupture, thus causing the outer and inner metal members to come in direct contact (catastropic failure or tearing of the rubber).

Runs 1 and 2 contained only one black, the S-315, and differed only in the type of crosslink system. Run 3 contained the blend of blacks, the level of which is equal to those used in Runs 1 and 2.

Comparing the black blend with the S-315 based control compositions, the black blend yielded bushings whose fatigue lives are, on the average, at least 100% better. More significantly, the improvement in fatigue life has been achieved at the slightly lower spring rate. At equal spring rate, the effect should be more pronounced.

The difference in fatigue behavior between the controls and the disclosed formulation may be related to the difference in dispersibility between the two systems of blacks. The blending concept should improve dispersion of the blacks based simply on a packing consideration. By improving dispersion, a more uniform distribution of aggregate sizes would result. This would tend to minimize the chance for undesirably large agglomerates to form in the rubber matrix. The presence of large agglomerates is deleterious to fatigue life since they act as stress risers where fatigue failure can be initiated.

It will be appreciated that the particle size of the S-315 is similar to that of the ISAF-HS black while its surface area and degree of structure are in between those of the ISAF-HS and the SRF blacks.

EXAMPLE 2

Following the procedure of Example 1, above, additional Silentblocs or bushings were prepared and tested. The basic rubber compound used had the following formulation:

| Ingredient | Parts by Weight |
|---|---|
| SMR-5 | 100 |
| ZnO | 5 |
| Stearic Acid | 1.5 |
| AMINOX | 1.0 |
| NOBS Special | 1.0 |
| Sulfur | 2.75 |

In these compounds the amounts of the ISAF-HS black, the SRF black and the Para Flux were varied as shown below. The Para Flux was used as a processing aid. The results obtained on testing the bushings are shown in Table 4, below:

TABLE 4

| Variables (phr) | | | Silentbloc Properties | | |
|---|---|---|---|---|---|
| ISAF-HS | SRF | PARA FLUX 2016 | K* kN/m | C kN-sec/m | N kc |
| 20 | 14 | 8 | 2942 | 2.03 | 208.5 |
| 25 | 18 | 5 | 4436 | 3.37 | 241.5 |
| 20 | 20 | 8 | 3445 | 3.18 | 99.75 |
| 15 | 10 | 11 | 1810 | 1.23 | 19.2 |
| 15 | 18 | 5 | 2480 | 1.76 | 130.5 |
| 25 | 10 | 5 | 3200 | 2.87 | 295.9 |
| 15 | 18 | 11 | 2245 | 1.65 | 46.5 |
| 20 | 7.3 | 8 | 2094 | 1.40 | 77.6 |
| 20 | 14 | 3 | 2770 | 2.30 | 120.4 |
| 20 | 14 | 13 | 2785 | 1.49 | 147.8 |
| 11.6 | 14 | 8 | 1750 | 1.10 | 15.8 |
| 25 | 18 | 11 | 3502 | 3.82 | 127.5 |
| 20 | 14 | 8 | 2490 | 2.01 | 81.4 |
| 25 | 10 | 11 | 2805 | 2.23 | 70.0 |
| 28 | 14 | 8 | 3825 | 3.84 | 143.5 |
| 20 | 14 | 8 | 2596 | 2.08 | 108.0 |
| 15 | 10 | 5 | 1936 | 1.37 | 26.0 |
| | | Average: | 2771 | 2.22 | 115.3 |
| Control = S-315 34 phr<br>PARA FLUX 2016 13 phr | | | 2400 | 2.17 | 14.6 |

EXAMPLE 3

Following the procedures of Examples 1 and 2, above, additional Silentblocs or bushings were prepared and tested.

The basic rubber compound used had the following formulation:

| Ingredient | Parts by Weight |
|---|---|
| SMR-5 | 100 |
| ZnO | 5 |
| Stearic Acid | 1.5 |
| AMINOX | 1.0 |
| NOBS Special | 1.0 |
| Sulfur | 2.75 |
| PARA FLUX 2016 | 13.0 |

The ISAF-HS and SRF blacks were used individually in the rubber bushing compound. The results on testing the bushings are shown in Table 5, below:

TABLE 5

| Variables (phr) | | Silentbloc Properties | | |
|---|---|---|---|---|
| ISAF-HS | SRF | K* kN/m | C kN-sec/m | N kc |
| 34.0 | — | 3083 | 2.01 | 231 ± 120 |
| — | 34.0 | 1850 | 0.49 | 26 ± 2 |

Deficiencies in bushings containing only one of the above carbon blacks were:

a. ISAF-HS alone:

Despite the improved fatigue life obtained relative to that of the control S-315 based bushings (Tables 3 and 4, above) the use of ISAF-HS alone entailed the following difficulties:

(1) Higher than desired compound viscosity, making it difficult to mix and process.

(2) Fatigue life improvement was obtained with an associated increase in K* and C. Increase in K* is not desirable although an increase in C may be desirable, depending on specific needs.

b. SRF alone:

Bushings based on SRF alone did not provide adequate fatigue life. Damping coefficient and K* were, also, significantly lower.

It, also, may be difficult to obtain uniform dispersion of other fillers like clay and silica with as large a particle size as SRF.

Notes for the Examples:

SMR-5: Standard Malaysian Rubber (grade 5).

PARA FLUX 2016: Petroleum hydrocarbon, Sp. gr. 1.0 to 1.02, dark viscous liquid, aromatic and asphaltic, flash point 235° F., viscosity SUS @ 210° F. of 74 to 94. The C. P. Hall Co.

TMTM: Tetramethylthiuram monosulfide.

NOBS Special: N-Oxydiethylene benzothiazole-2-sulfenamide. American Cyanamid.

AMINOX: Low temperature diphenylamine acetone reaction product. Uniroyal Chemical.

S-315: ASTM S-315. Reinforcing furnace black. Degree of structure, DBPA (cc/100 g)-79 to 81; particle size (m$\mu$)-26; surface area (m$^2$/g)-88. Phillips Petroleum Co.

ISAF-HS: ASTM N234. Reinforcing furnace black. Intermediate super abrasion furnace, high structure. DBPA (cc/100 g)-125; particle size (m$\mu$)-21; surface area 121 (m$^2$/g). Ashland Chemical Co.

SRF: ASTM N 774—Reinforcing furnace black. Semireinforcing furnace. DBPA (cc/100 g)-72; particle size (m$\mu$)-70; surface area (m$^2$/g)-27. J. M. Huber Corp.

I claim:

1. A resilient bushing exhibiting improved fatigue life and having an annular molded vulcanized rubber compound insert in compressed relation between a substantially rigid cylindrical inner member and a substantially rigid cylindrical outer member wherein said rubber compound contains (A) from about 10 to 30 phr of a reinforcing furnace carbon black having a particle size of from about 15 to 50 m$\mu$, a surface area of from about 60 to 140 m$^2$/g and a DBPA of from about 80 to 135 cc/100 g and (B) from about 5 to 30 phr of a reinforcing furnace carbon black having a particle size of from about 50 to 85 m$\mu$, a surface area of from abut 20 to 50 m$^2$/g and a DBPA of from about 50 to 80 cc/100 g and where the rubber of said compound is selected from the group consisting of natural rubber and polyisoprene rubber and mixtures thereof.

2. A bushing according to claim 1 where said inner and outer cylindrical members are of steel and where the rubber of said compound is natural rubber.

3. A vulcanizable unvulcanized rubber compound containing (A) from about 10 to 30 phr of a reinforcing furnace carbon black having a particle size of from about 15 to 50 m$\mu$, a surface area of from about 60 to 140 m$^2$/g and a DBPA of from about 80 to 135 cc/100 g and (B) from about 5 to 30 phr of a reinforcing furnace carbon black having a particle size of from about 50 to 85 m$\mu$, a surface area of from about 20 to 50 m$^2$/g and a DBPA of from about 50 to 80 cc/100 g.

4. A vulcanizable unvulcanized rubber compound according to claim 3 where the rubber of said compound is selected from the group consisting of natural rubber and polyisoprene rubber and mixtures thereof.

5. A vulcanizable unvulcanized rubber compound according to claim 4 where the rubber is natural rubber.

6. A vulcanized rubber compound containing (A) from about 10 to 30 phr of a reinforcing furnace carbon black having a particle size of from about 15 to 50 m$\mu$, a surface area of from about 60 to 140 m$^2$/g and a DBPA of from about 80 to 135 cc/100 g and (B) from about 5 to 30 phr of a reinforcing furnace carbon black having a particle size of from about 50 to 85 mμ, a surface area of from about 20 to 50 m$^2$/g and a DBPA of from about 50 to 80 cc/100 g.

7. A vulcanized rubber compound according to claim 6 where the rubber of said compound is selected from the group consisting of natural rubber and polyisoprene rubber and mixtures thereof.

8. A vulcanized rubber compound according to claim 7 where the rubber is natural rubber.

* * * * *